(12) United States Patent
Liu

(10) Patent No.: US 10,129,145 B2
(45) Date of Patent: Nov. 13, 2018

(54) ROUTING IPV6 PACKETS BETWEEN AUTONOMOUS SYSTEMS

(71) Applicant: CHARTER COMMUNICATIONS OPERATING, LLC, St. Louis, MO (US)

(72) Inventor: Chia J. Liu, Sun Prairie, WI (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 119 days.

(21) Appl. No.: 15/183,161

(22) Filed: Jun. 15, 2016

(65) Prior Publication Data

US 2017/0366454 A1    Dec. 21, 2017

(51) Int. Cl.
| | |
|---|---|
| *H04L 12/721* | (2013.01) |
| *H04L 12/749* | (2013.01) |
| *H04L 12/741* | (2013.01) |
| *H04L 29/12* | (2006.01) |

(52) U.S. Cl.
CPC ............ *H04L 45/72* (2013.01); *H04L 45/741* (2013.01); *H04L 45/745* (2013.01); *H04L 61/1511* (2013.01); *H04L 61/2015* (2013.01); *H04L 61/6059* (2013.01)

(58) Field of Classification Search
CPC ....... H04L 45/48; H04L 45/72; H04L 45/741; H04L 45/745; H04L 45/748; H04L 61/1511
See application file for complete search history.

(56) References Cited

U.S. PATENT DOCUMENTS

| | | | | |
|---|---|---|---|---|
| 2002/0176427 | A1* | 11/2002 | Noda | H04L 29/06 370/401 |
| 2002/0196793 | A1* | 12/2002 | Samba | H04L 29/06 370/401 |
| 2013/0227165 | A1* | 8/2013 | Liu | H04L 67/1027 709/238 |
| 2015/0029872 | A1* | 1/2015 | Pignataro | H04L 43/10 370/252 |
| 2017/0019430 | A1* | 1/2017 | Cohn | H04L 65/1036 |

* cited by examiner

*Primary Examiner* — Peter Chen
(74) *Attorney, Agent, or Firm* — Meagher Emanuel Laks Goldberg & Liao, LLP

(57) ABSTRACT

Systems, methods, architectures, mechanisms or apparatus for routing packets between source and destination endpoints associated with different autonomous systems without requiring public advertising of the addresses of the source and destination endpoints to other autonomous systems (ASN).

22 Claims, 8 Drawing Sheets

```
 0                   1                   2                   3
 0 1 1 3 4 5 6 7 0 1 2 3 4 5 6 7 0 1 2 3 4 5 6 7 0 1 2 3 4 5 6 7
+-+-+-+-+-+-+-+-+-+-+-+-+-+-+-+-+-+-+-+-+-+-+-+-+-+-+-+-+-+-+-+-+
|Version| Traffic Class |              Flow Label               |
+-+-+-+-+-+-+-+-+-+-+-+-+-+-+-+-+-+-+-+-+-+-+-+-+-+-+-+-+-+-+-+-+
|         Payload Length        |  Next Header  |   Hop Limit   |
|                               |       60      |               |
+-+-+-+-+-+-+-+-+-+-+-+-+-+-+-+-+-+-+-+-+-+-+-+-+-+-+-+-+-+-+-+-+
|                                                               |
|                         Source Address                        |
+-+-+-+-+-+-+-+-+-+-+-+-+-+-+-+-+-+-+-+-+-+-+-+-+-+-+-+-+-+-+-+-+
|                                                               |
|                       Destination Address                     |
+-+-+-+-+-+-+-+-+-+-+-+-+-+-+-+-+-+-+-+-+-+-+-+-+-+-+-+-+-+-+-+-+
|  Option Type  | Opt Data Len  |          Option Data          |
|      02       |      64       |                               |
+-+-+-+-+-+-+-+-+-+-+-+-+-+-+-+-+-+-+-+-+-+-+-+-+-+-+-+-+-+-+-+-+
```

FIG. 2

| 0 | 0 | 0 | 0 | 0 | 0 | 1 | 0 | 0 | 0 | 0 | 0 | 1 | 0 | 0 | 0 |
|---|---|---|---|---|---|---|---|---|---|---|---|---|---|---|---|

Source IPv6 Address (17th-144th bits)

Source's ISP Gateway Router IPv6 Addr (145th- 272nd bits)

DestinationIPv6 Address (273th-400th bits)

Destination's ISP Gateway Router IPv6 Addr (401th-528th bits)

FIG. 3

| Option_IAADDR | Option-len |
|---|---|
| IPv6 Address (for the customer/node) | |
| IPv6 Address -1 (Primary ISP Gateway for the customer/node) | |
| IPv6 Address -2 (Secondary ISP Gateway for the customer/node) | |
| preferred-lifetime | |
| valid-lifetime | |
| IAaddr-options | |

ROUTING IPV6 PACKETS BETWEEN AUTONOMOUS SYSTEMS

FIELD OF THE DISCLOSURE

The present disclosure generally relates to communications networks and, more particularly but not exclusively, to routing packets between source and destination endpoints located in different autonomous systems.

BACKGROUND

The current Internet Protocol, Version 4 (IPv4) routing table size of internet routers is very large and growing rapidly such that the memory required to store such IPv4 routing tables is approaching the storage limit of many routing platforms. In addition, given the use of IPv6 addressing and the need to provide both IPv6 and IPv4 to coexist and dual stack in most production network routers, even those routing platforms having sufficient memory to store very large routing tables will experience latency issues due to the amount of time necessary to look up information within such very large routing tables.

SUMMARY

Various deficiencies in the prior art are addressed by systems, methods, architectures, mechanisms or apparatus for routing packets between source and destination endpoints associated with different autonomous systems without requiring public advertising of the addresses of the source and destination endpoints. In this manner, routing tables used by routing platforms may be reduced in size since.

In particular, a packet to be routed in accordance with various embodiments uses an IPv6 Destination Option extension header to store IPv6 address information associated with the packet source (i.e., source endpoint), source gateway, destination gateway and destination i.e., destination endpoint) such that intermediate gateways and/or routers may properly route the packet toward the packet destination endpoint.

BRIEF DESCRIPTION OF THE DRAWINGS

The teachings herein can be readily understood by considering the following detailed description in conjunction with the accompanying drawings, in which:

FIG. 2 depicts an exemplary format of an IPv6 packet structure according to an embodiment;

FIG. 3 depicts an exemplary format of a Prefix Reduction Option (PRO) packet according to an embodiment;

To facilitate understanding, identical reference numerals have been used, where possible, to designate identical elements that are common to the figures.

DETAILED DESCRIPTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

Various embodiments will be described within the context of routing the packet from a source endpoint in one autonomous system (AS) to a destination endpoint in another autonomous system, perhaps via one or more intermediate autonomous systems. For example, routing packets between a client device connecting to the public Internet via an access network or autonomous system of a first Internet Service Provider (ISP) and a server connected to the public Internet via a different autonomous system.

Advantageously, by implementing the various embodiments described herein, only the addresses of routing elements within the various autonomous systems need be publicly advertised; addresses of endpoints need not be advertised outside of their respective autonomous systems. In this manner, the routing tables used by the various routing platforms of each autonomous system avoid the need to store address information associated with endpoint devices outside of the relevant autonomous system. This results in a dramatic reduction in routing table memory usage, table look up latency and so on at the respective routing platform.

Figure 1:
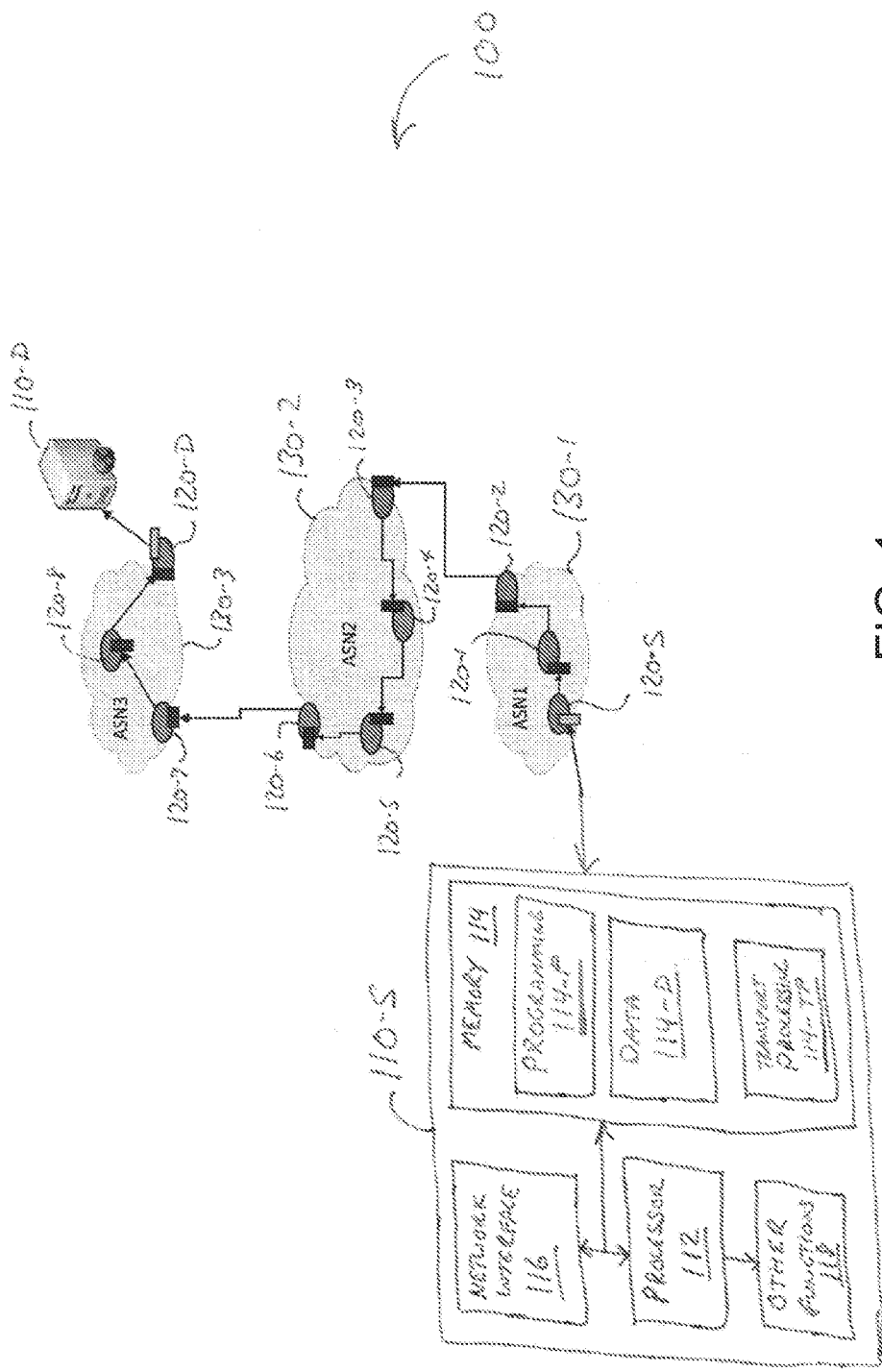
FIG. 1 depicts a high-level block diagram of a network benefiting from various embodiments.

FIG. 1 depicts a high-level block diagram of a network benefiting from various embodiments. Specifically, FIG. 1 depicts a plurality of autonomous systems in which packets conveyed between source and destination endpoints associated with different autonomous systems are formed and routed in accordance with various embodiments.

Referring to FIG. 1, a first or source endpoint 110-S is depicted as communicating with a first autonomous system 130-1 via a respective gateway 120-S. The first autonomous system 130-1 is depicted as communicating with a second autonomous system 130-2, which in turn is depicted as communicating with a third autonomous system 130-3. A second or destination endpoint 110-D is depicted as communicating with the third autonomous system 130-3 via a respective gateway 120-D. It is noted that each of the autonomous systems 130 includes a respective plurality of gateway devices and/or routing devices 120. For example, first autonomous system 130-1 is depicted as including gateways/routers 120-S, 120-1 and 120-2, second autonomous system 130-2 is depicted as including gateways/routers 120-3 through 120-6, and third autonomous system 130-3 is depicted as including gateways/routers 120-7, 120-8 and 120-D. More or fewer gateways/routing devices may be used to implement any of the autonomous systems 130. Is working arrangements including more or fewer autonomous systems 130 may also benefit from the various embodiments. Autonomous systems 130 may comprise Internet Service Provider (ISP) access networks, third-party networks, secure enterprise networks and the like.

A simplified implementation of source endpoint 110-S is depicted as including one or more processor(s) 112, a memory 114, a network interface 116 and, optionally, circuitry 118 adapted to implement various other functions. The processor(s) 112 is coupled to each of the memory 114, the network interface 116, and the optional circuitry 118.

The processor(s) 112 is adapted to cooperate with the memory 114, the network interface 116, the optional circuitry 118 and various support circuits (not shown) to provide various functions as described herein.

The memory 114, generally speaking, stores programs, data, tools and the like that are adapted for use in providing various functions as described herein with respect to the figures. For example, the memory 114 is depicted as including one or more programming modules 114-P, data and/or database storage 114-D and a packet transport processing module 114-TP.

The network interface 116 is adapted to facilitate communications with various network elements, nodes and other entities such as the gateways/routers 120 described herein.

The source endpoint 110-S may comprise a computing device, smart phone, set top box in/or other client device capable of accessing gateway 120-S either directly or indirectly such as via a modem or other device (not shown).

The destination endpoint 110-D may be implemented in a manner similar to that described herein with respect to source endpoint 110-S. Similarly, the gateways/routers 120 described herein may also be implemented in a manner similar to that described herein with respect to source endpoint 110-S, though with the addition of various switching/routing functions as will be appreciated by those skilled in the art. Generally speaking, the endpoints 110 and gateways/routers 120 may be implemented as described herein and/or in accordance with the computing device described below with respect to FIG. 8.

Various embodiments contemplate the use of a new PRO (Prefix Reduction Option) within an IPv6 destination header for packets to be transmitted from autonomous system to another, either directly or via one or more intermediate autonomous systems. Various embodiments contemplate that PRO address data of a packet to be routed contains four IPv6 addresses; namely, the IPv6 addresses of the packet source (e.g., source endpoint 110-S), the source gateway (e.g., gateway 120-S), the packet destination (e.g., destination endpoint 110-D) and the destination gateway (e.g., gateway 120-D).

Various embodiments contemplate the use of enhanced DNSv6 QUAD-A (AAAA) Resource Record (RR) records to provide thereby the IPv6 address of the ISP gateway of an enterprise application server.

Various embodiments contemplate a Dynamic Host Configuration Protocol for IPv6 (DHCPv6) Identity Association (IA) Address option including the IPv6 address of the ISP gateway of a user.

Various embodiments contemplate using a destination option header with the newly defined PRO and enhanced capability of DNSv6 and DHCPv6 to provide a mechanism to route IPv6 packets through gateway/routers having minimal sized IPv6 routing tables.

The various embodiments contemplate that each autonomous system number (ASN) advertises a single IPv6 block into the public IPv6 Internet, the advertised IPv6 block being that used for loopback of the provider equipment (PE) associated with the ASN, such as the various gateways/routers 120 associated with a particular AS 130. By advertising a summary or aggregate of address information associated with an ASN, the size of the routing tables used by the various routing entities within the network may be greatly reduced.

IPv6 Destination Options Header with Prefix Reduction Option TLV

The IPv6 specification is described in detail in various Internet Engineering Task Force (IETF) Requests for Comment (RFC), such as RFC2460 and related documents. The use of IPv6 as currently promulgated, as with IPv4, disadvantageously results in the use of very large routing tables at routing devices. The situation is exacerbated within the context of transporting packets between multiple autonomous systems, especially autonomous systems having large numbers of client devices and/or other packet transmission endpoints. Fragmented allocation of IP space to client devices and/or transmission end points also contributes to the overall large number of routing prefixes in the global routing table. The exemplary embodiments and disclosed PRO help reduce the number of prefixes if fragmentation of IPv6 allocation cannot be avoided, such as due to lack of network-wide IPv6 master allocation plan, merger, rearrangement of network topology and/or any other reason.

Various embodiments use a new type-length-value (TLV) element denoted herein as a "Prefix Reduction Option" TLV. The PRO TLV is used to adapt IPv6 destination options headers to provide advanced route signaling abilities well suited for use within the context of multiple autonomous system packet routing.

FIG. 2 depicts an exemplary format of an IPv6 packet structure adapted as follows:

(1) The 8-bit "Next Header" field, which identifies the type of header immediately following the current header, is set to 60 to identify the next header as a Destination Option header (i.e., carrying optional information that need be examined only by a packet destination).

(2) The 8-bit "Option Type" field of the destination option header, which identifies the type of destination options header, is set to (illustratively) 2 to indicate a PRO TLV.

(3) the 8-bit "Option Data Length" field of the destination option, which indicates the number of bytes stored in the "Option Data" field, is set to 8 (in units of 8 octets) so as to store four different IPv6 addresses.

FIG. 3 depicts an exemplary format of a PRO TLV described herein. Specifically, the first eight bits comprise the Option Type Field (e.g., 2), the second eight bits comprise the Option Data Length (e.g., 8), and the remaining 64 bytes comprise the IPv6 addresses of the packet source (e.g., source endpoint 110-S), the source gateway (e.g., gateway 120-S), the packet destination (e.g., destination endpoint 110-D) and the destination gateway (e.g., gateway 120-D).

It is noted that the exemplary option type 2 may be replaced by any other agreed-upon option type number or identifier. Further, additional information may be included within the option data field if desired, such additional data increasing the length of data within the option data field and, therefore, necessitating an increase in the option data length indicator. Further, the option data length is selected as 64 bytes to represent the four different 16-byte IPv6 addresses stored. It will be appreciated that the use of shorter or longer addresses would necessitate a change in the option data length indicator.

Packet Processing and Routing

Figure 4:
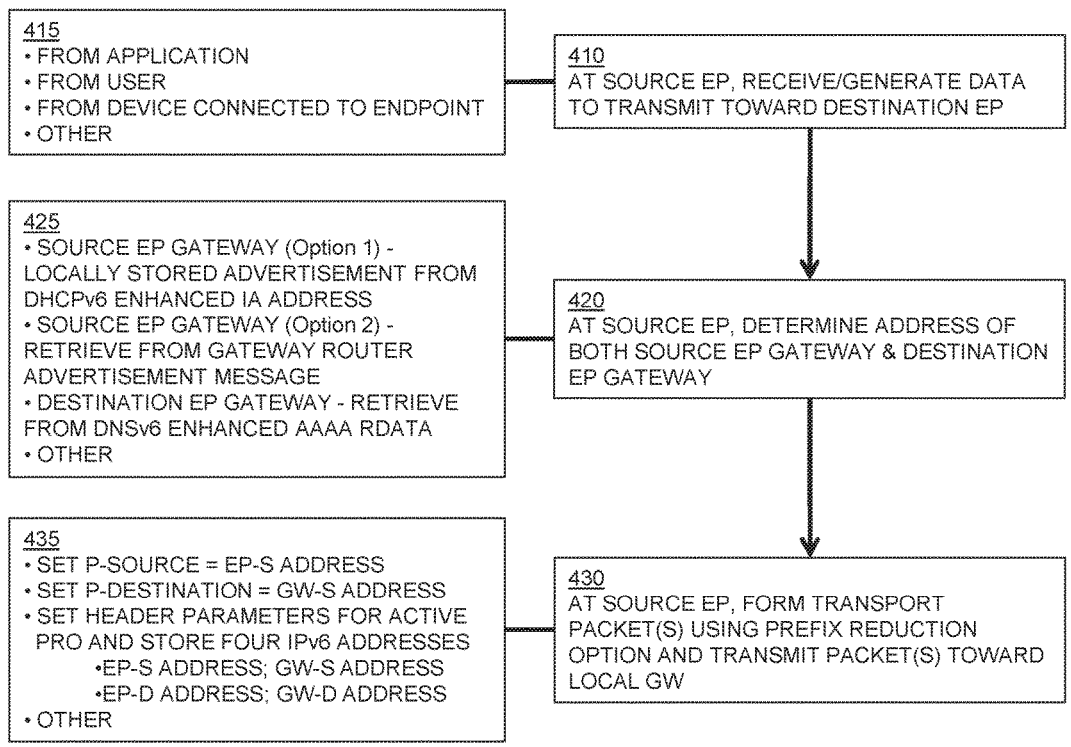
FIG. 4 depicts a flow diagram of a method of forming and transmitting a data packet in accordance with an embodiment.

FIG. 4 depicts a flow diagram of a method of forming and transmitting a data packet in accordance with one embodiment. Specifically, the method 400 of FIG. 4 depicts a method of forming and transmitting a PRO packet as described herein such as at a packet transmission source or endpoint, illustratively endpoint 110-S.

At step 410, a source endpoint receives or generates data to transmit toward a destination endpoint. Referring to box 415, the data to be transmitted may be received from smart phone or set-top box app, a computer application and the like. The data to be transmitted may be received from a user of the end point (e.g., user input entered into a client device via the user interface), from a device connected to the end point (e.g., a device providing diagnostic information or content to a home or enterprise server) and/or via some other source. For example, the source endpoint might comprise a smart phone or other client device running a streaming video or other application generating data for transmission to a destination endpoint, such as a remote storage application or other client device or server device.

At step 420, the source endpoint determines the address of a gateway associated with the source endpoint (EP) as well as the address of the gateway associated with the destination EP. It is assumed that the source endpoint and destination endpoint are within different autonomous systems. Referring to box 425, this information may be determined via an advertisement (e.g., a Router Advertisement such as in accordance with IETF RFC 4861 or some other advertisement mechanism). For example, the source EP gateway may be determined via a locally stored advertisement from a Dynamic Host Configuration Protocol (DHCP) server such a provided via the Internet Service Provider (ISP) servicing the source endpoint, such as via DHCPv6 enhanced IA address retrieved from a gateway router advertisement message and/or determined in some other manner. For example, the destination EP gateway may be determined using a Domain Name Server (DNS), such as via DNSv6 enhanced AAAA RDATA. In various embodiments, gateway router addresses are advertised between different AS regions whereas endpoint addresses are not. In various embodiments, some of the endpoint addresses may be advertised between different AS regions.

At step 430, the source endpoint forms one or more transport packets in accordance with the PRO TLV described herein. The source endpoint transmits the transport packets toward its local gateway (e.g., gateway 120-S).

Referring to box 435, the source endpoint forms packets substantially in accordance with the IPv6 specification including the PRO TLV as described above with respect to FIGS. 2-3. In particular, the IPv6 address of the source endpoint is stored in the source address field and the IPv6 address of the destination endpoint is stored in the destination address field. In addition, the IPv6 addresses of the source endpoint, source endpoint gateway, destination endpoint and destination endpoint gateway are stored in the PRO TLV as previously described. It will be noted that while these addresses are described herein as being stored in a particular order, any agreed-upon order will suffice for this purpose.

In various embodiments, the processing of a packet as described above with respect to FIG. 4 may be performed at a gateway device or other routing element associated with a client device. For example, a gateway device or other routing element may receive from a source endpoint such as the client device a packet that does not include an active PRO TLV indication and/or PRO address data. The gateway device or other routing element may then perform the various steps of the method 400 to provide thereby a packet with active PRO TLV indication and PRO address data, which packet may then be transmitted toward a destination gateway device or other routing element associated with a destination endpoint.

Figure 5:
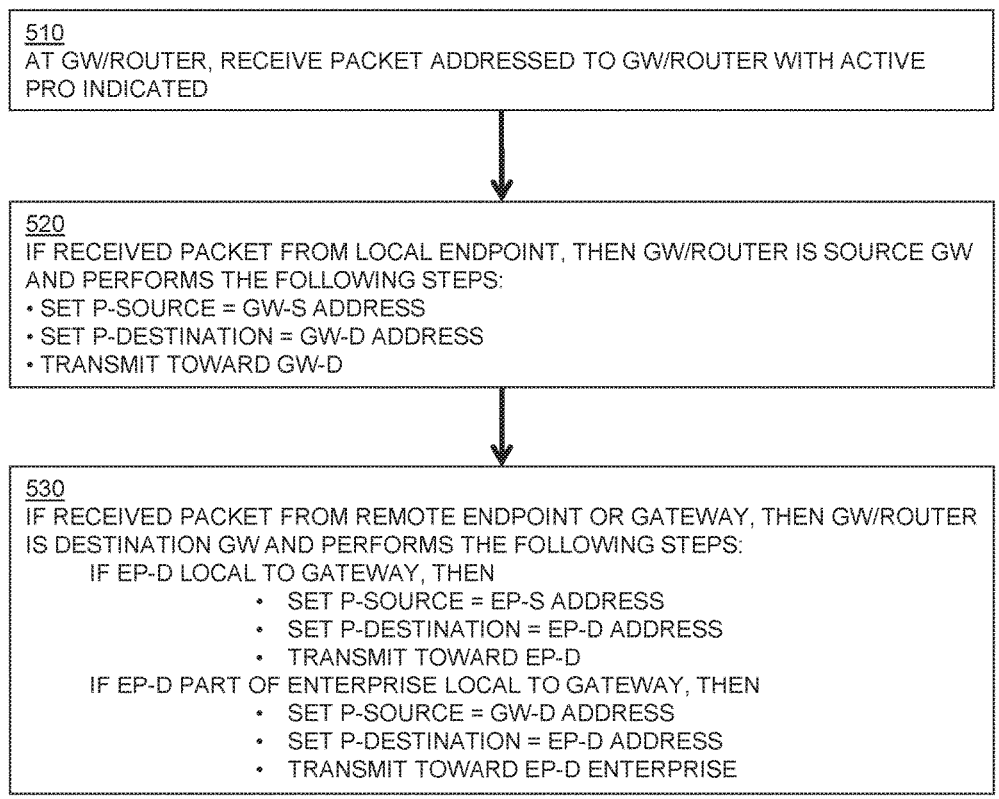
FIG. 5 depicts a flow diagram of a method of routing a data packet in accordance with an embodiment.

FIG. 5 depicts a flow diagram of a method of routing a data packet in accordance with one embodiment. Specifically, the method 500 of FIG. 5 depicts a method of receiving, processing and routing a PRO packet as described herein such as at an ISP or AS gateway or other routing entity within the network, illustratively a gateway/router 120.

At step 510, the gateway or other routing device receives a packet addressed to the GW/router (i.e., received packet destination address set to GW/router address). As such, the GW/router examines the information stored within a destination extension header, such as the PRO TLV described above. If the packet is an active PRO packet, then the method 500 continues to step 520.

At step 520, the GW/router determines if the packet has been received from a local endpoint (e.g., a client device accessing Internet services via the GW/router). If the received packet source address is associated with a local endpoint, then the GW/router receiving the packet comprises a source GW as described herein. That is, if the $2^{nd}$ IPv6 address in the PRO is one of the interface IPv6 address of the router, the router will recognize itself as the source GW of the incoming IPv6 packet. This source GW performs the steps of:

(1) setting the packet source address to the source gateway address (i.e., its own address)

(2) setting the packet destination address to the address of the gateway associated with the destination endpoint (i.e., the destination gateway address as stored in the PRO option data field); and (3) transmitting the modified packet toward the destination gateway.

At step 530, if the GW/router has determined that the packet is been received from a remote endpoint (e.g., a client device accessing Internet services via a gateway in some other autonomous system), then the GW/router comprises a destination GW as described herein. That is, if the 4th IPv6 address in the PRO is one of the interface IPv6 address of the router, the router will recognize itself as the destination GW of the incoming IPv6 packet. The GW/router is locally connected to the destination endpoint or to an enterprise network including the destination endpoint.

If the GW/router is locally connected to the destination endpoint, then it performs the steps of:

(1) setting the packet source address to the address of the source endpoint (i.e., the source endpoint address as stored in the PRO option data field);

(2) setting the packet destination address to the address of the destination endpoint (i.e., the destination endpoint address as stored in the PRO option data field); and (3) transmitting the modified packet toward the destination endpoint.

If the GW/router is locally connected to an enterprise network including the destination endpoint, then it performs the steps of:

(1) setting the packet source address to the destination gateway address (i.e., the destination gateway address as stored in the PRO option data field);

(2) setting the packet destination address to the address of the destination endpoint (i.e., the destination endpoint address as stored in the PRO option data field); and (3) transmitting the modified packet toward the enterprise network including destination endpoint.

Generally speaking, the PRO packet formation and processing methods described herein such as with respect to FIGS. 4-5 contemplate various network elements performing respective functions as follows:

Source Device Functions:
1. Receive application data or other data to transmit toward destination device/endpoint.
2. If destination gateway address is not known, then get destination gateway address via DNS query.
3. Form packet to be transmitted in accordance with Prefix Reduction Option (PRO) as discussed herein.
   a. Set packet source address as source device address.
   b. Set packet destination address as source gateway address.
   c. IPv6 destination options header indicated as in use and including a Prefix Reduction Option (PRO) as follows:
      i. option type: 2
      ii. option data length: 64 bytes
      iii. option data: four IPv6 addresses as follows:
         1. source IPv6 address
         2. source ISP gateway IPv6 address
         3. destination IPv6 address
         4. destination ISP gateway IPv6 address
4. Transmit packet toward source gateway.

Source Gateway Functions:
1. Receive packet from source device with PRO option active.
2. Parse packet header to examine PRO data (i.e., four IPv6 addresses).
3. Set packet source address as source gateway address.
4. Set packet destination address as destination gateway address.
5. Transmit packet toward destination gateway.

Destination Gateway Functions:
1. Receive packet from source or intermediate gateway with PRO option active.
2. Parse packet header to examine PRO data (i.e., four IPv6 addresses).
3. Set packet source address as source address.
4. Set packet destination address as destination address.
5. Transmit packet toward destination.

Destination Device Functions:
1. Receive packet from destination gateway.
2. Extract application data or other data from packet.
3. Provide extracted application data or other data to destination device/endpoint.

Figure 6:
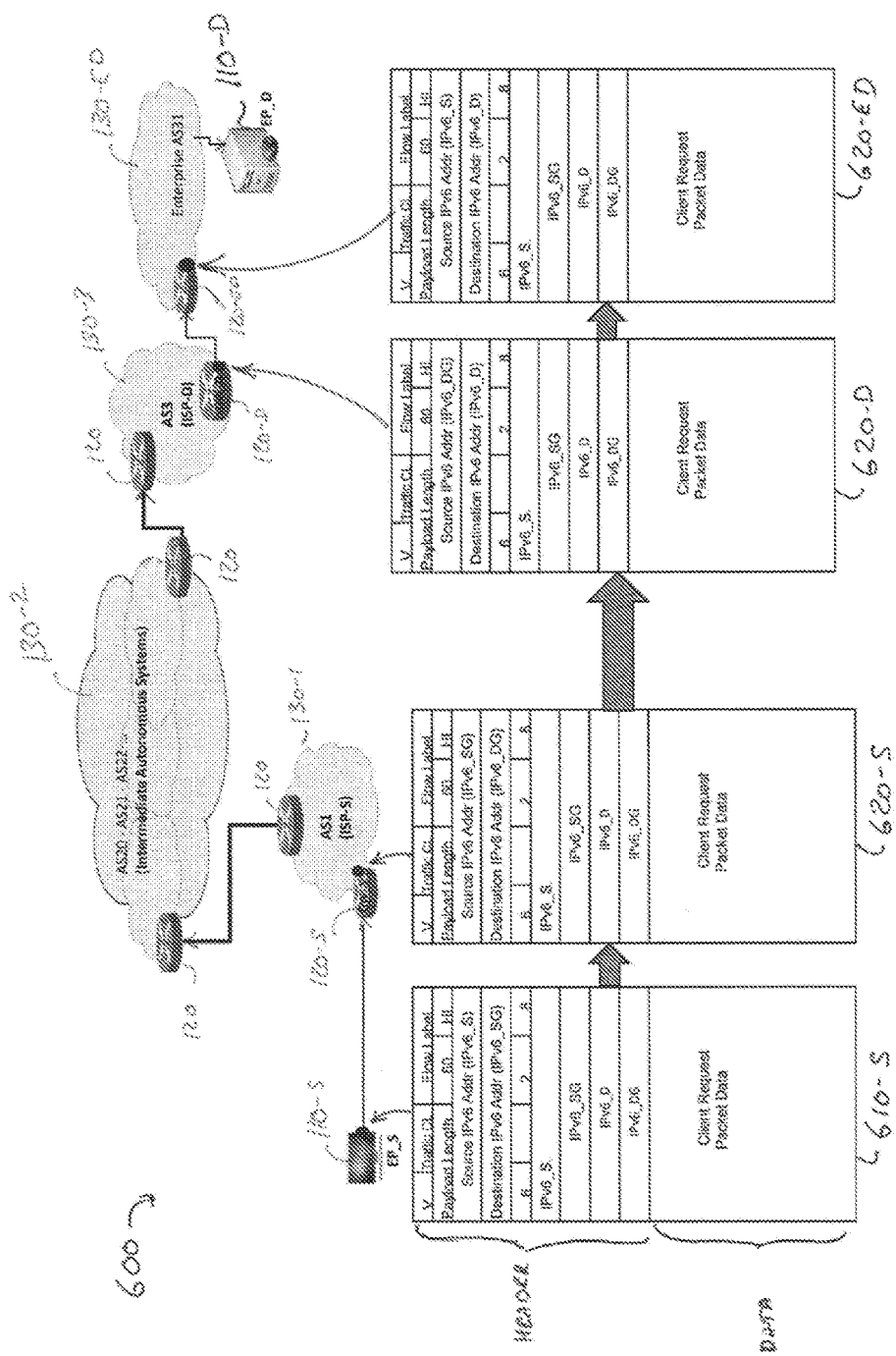
FIGS. 6-7 graphically depict the contents of a PRO packet transmitted between autonomous systems in accordance with an embodiment.

FIG. 6 graphically depicts the contents of a PRO packet transmitted from a source endpoint 110-S at a first autonomous system 130-1 to a destination endpoint 110-D included within an enterprise network 130-ED at a final autonomous system 130-3. The graphical representation 600 of FIG. 6 substantially reflects the multiple asynchronous system topology and PRO formation/routing methods described above with respect to the various figures. As such, only information different from the prior figures will be discussed in detail.

Graphical element 610-S depicts a PRO packet formed by a source endpoint 110-S for transmission toward source gateway 120-S. The packet includes a header portion including the header information described above with respect to the PRO TLV, as well as a data portion including the data to be transmitted from the source endpoint 110-S to the destination endpoint 110-D. It can be seen by inspection that the IPv6 source address of this packet is set to that of source endpoint 110-S, while the IPv6 destination address of this packet is set to that of source gateway 120-S. Further, the PRO option data includes the source endpoint, source gateway, destination endpoint and destination gateway addresses as previously described.

Graphical element 620-S depicts the PRO packet of 610-S as modified by the source gateway 120-S. It can be seen by inspection that the IPv6 source address of this packet is set to that of the source gateway 120-S, while the IPv6 destination address of this packet is set to that of destination gateway 120-D.

Graphical element 620-D depicts the PRO packet of 620-S as modified by the destination gateway 120-D. It can be seen by inspection that the IPv6 source address of this packet is set to that of the destination gateway 120-D, while the IPv6 destination address of this packet is set to that of destination endpoint 110-D.

Graphic element 620-ED depicts the PRO packet of 620-D as modified by an enterprise network Gateway element 120-ED. It can be seen by inspection that the IPv6 source address of this packet is set to that of the source endpoint 110-S, while the IPv6 destination address of this packet is set to that of destination endpoint 110-D.

It is noted that if destination endpoint 110-D accessed AS 130-3 directly via destination gateway 120-D, then the destination gateway 120-D would have produced a packet having the structure depicted in graphical element 620-ED rather than that of graphical element 620-D.

Figure 7:
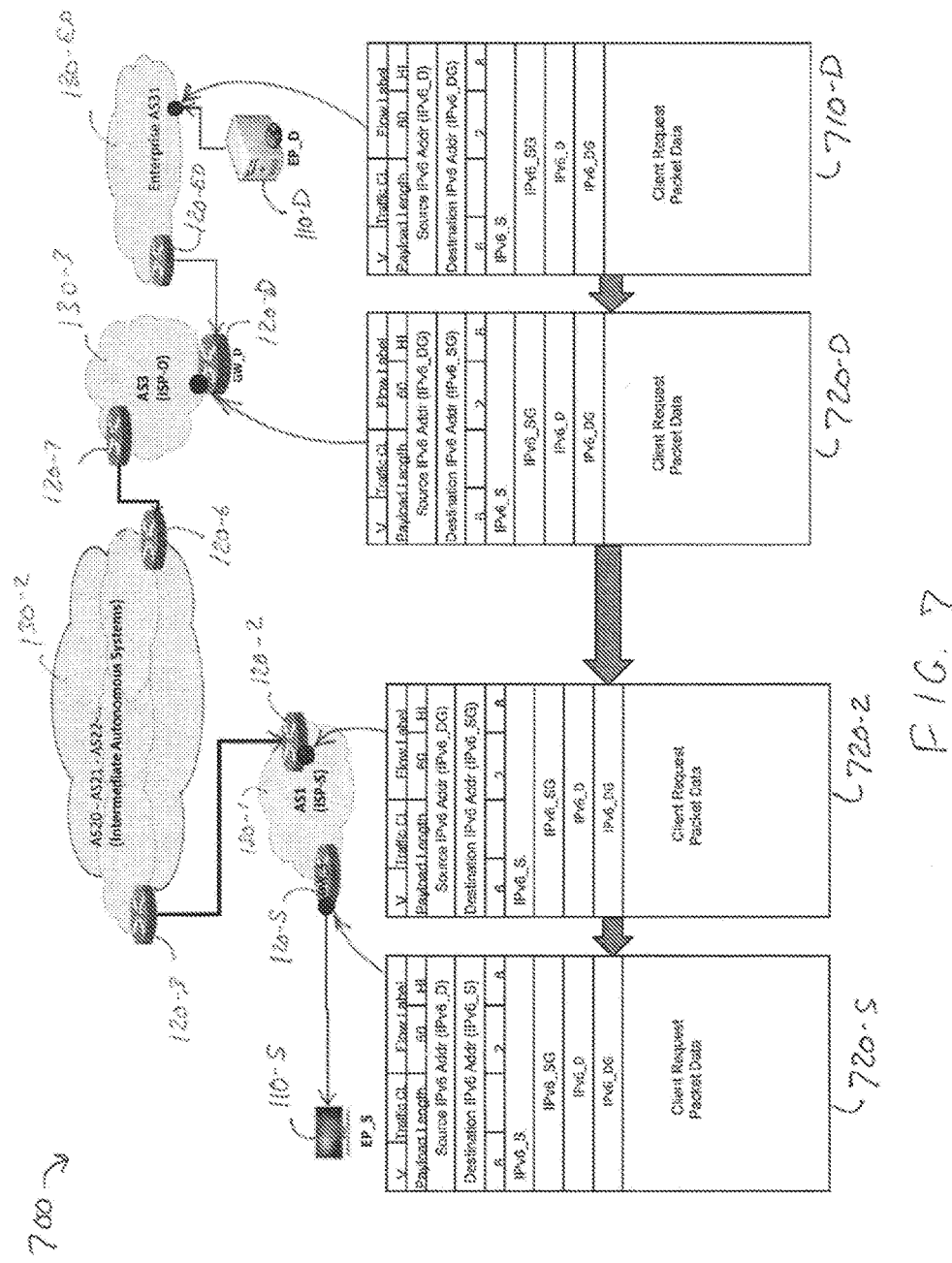

FIG. 7 graphically depicts the contents of a PRO packet returned from a destination endpoint to a source endpoint. That is, FIG. 7 graphically depicts the contents of a PRO packet transmitted from the destination endpoint 110-D to the source endpoint 110-S within the topology described above with respect to FIG. 6. An example of such a transmission may comprise an acknowledgment of a packet previous a transmitted from the source endpoint 110-S, session setup/maintenance information associated with the source endpoint 110-S or an application/service invoked at the source endpoint 110-S, link and/or path quality of service information and so on.

Graphic element 710-D depicts a PRO packet formed by destination endpoint 110-D for transmission toward source endpoint 110-S. It can be seen by inspection that the IPv6 source address of this packet is set to that of destination endpoint 110-D, while the IPv6 destination address of this packet is set to that of destination gateway 120-D. Further, the PRO option data includes the source endpoint, source gateway, destination endpoint and destination gateway addresses as previously described. It is noted that this packet will traverse enterprise gateway 120-ED prior to reaching AS3 gateway 120-D.

Graphic element 720-D depicts the PRO packet of 710-D as modified by destination gateway 120-D. It can be seen by inspection that the IPv6 source address of this packet is set to that of the destination gateway 120-D, while the IPv6 destination address of this packet is set to that of source gateway 120-S.

In particular, the packet content (L720-2) in router 120-2 (including its Source IPv6 Address and Destination IPv6 Address) is depicted as being the same as the packet content (L720-D) in the outgoing interface of router/gateway 120-D. This depiction is provided to illustrate the packet information to be changed by router/gateway 120-S. In this example there is no change in the header of the IPv6 packet as it is propagated from destination gateway 120-D to destination router 120-2 as depicted in FIG. 7.

Graphic element 720-S depicts the PRO packet of 720-2 as modified by source gateway 120-S. It can be seen by inspection that the IPv6 source address of this packet is set to that of the destination endpoint 110-D, while the IPv6 destination address of this packet is set to that of source endpoint 110-S.

ISP Gateway Resource Record (GRR)

Generally speaking, an DNS (Domain Name System) provides a database of host information, wherein a service DNS provides host information pertaining to one or more services (e.g., the internet host entities supporting the one or more services). Thus, a DNS query, depending on the context of the query, may be used to return a network address, hardware information (host information, such as CPU type and operating system type), mail-routing information (MX mail exchanger) and so on. A source entity (e.g., EP-S) may learn the IPv6 address of a target/destination entity (e.g., EP-D) via a DNS query that returns an AAAA record (i.e., IPv6 address) of the target/destination entity. However, existing DNS queries do not return the 'gateway' (e.g., GW-D) IPv6 information of the queried 'target/destination' entity.

In various embodiments the GW-D address may be determined using a local Domain Name Server (DNS) such as provided by a local ISP. These embodiments may use a new type of RR, denoted herein as an ISP Gateway Resource Record (GRR), that may be used to provide the IPv6 address of the gateway router of the internet service provider that a server or application of interest subscribes to.

In various embodiments, a GRR is stored in the DNS database for each zone (or each AAAA record) of an ISP. When an application or server performs a DNS query, the result of the query will include the IPv6 address of both the queried target and its ISP gateway for IPv6 internet connectivity. The destination entity IPv6 address and its corresponding ISP gateway IPv6 address may be cached in the source application.

Figures 8, 9:
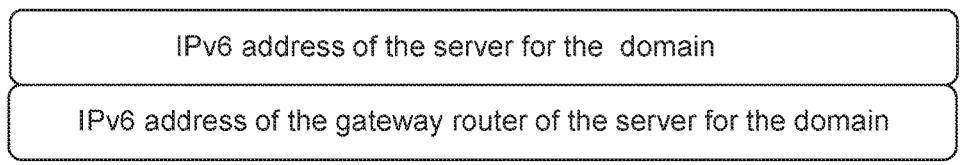
FIG. 8 depicts an exemplary format of an AAAA Resource Record (RR) having enhanced RDATA according to an embodiment.
FIG. 9 depicts an exemplary format of an enhanced DHCPv6 IA address option according to an embodiment.

FIG. 8 depicts an exemplary format of an AAAA Resource Record (RR) having enhanced RDATA. Specifically, In various embodiments, AAAA RR with ISP Gateway Info for an application server is provided. For example, the RDATA for an AAAA Resource Record is enhanced to add additional data (illustratively 128-bits) after the IPv6 address of the concerned domain name of an application. The 16 bytes will store the IPv6 address of the ISP gateway for the application. In the case of multiple gateways (e.g., such as in a fail-over implementation), the size of the RDATA may be increased accordingly (e.g., 256-bits). When a user needs to access an application server (e.g., http://www.myuserbankapplication.com) the DNS query from the user's client device will retrieve the IPv6 address of both the application server itself and the ISP gateway servicing the application server.

FIG. 9 depicts an exemplary format of an enhanced DHCPv6 IA address option according to an embodiment. Specifically, in various embodiments an application server may enhance security by finding/confirming the ISP gateway of its customer(s) by examining received packets, such as the contents of the destination header with PRO active as described above. If the PRO option does not contain the ISP gateway of the customer, an application server (e.g., http://www.myuserbankapplication.com, a financial institution application server) can drop the packet. In this manner, received packets can be subjected to additional source-authentication by the application server to thereby enhance security for the application server.

Similarly, customers may also determine their own ISP gateways using embodiments providing an enhanced DHCPv6 IA Address Option in which a new configuration parameter "ISP Gateway" is provided. In this example, the information regarding the ISP gateway of the user will be given when a node initiates Request or Information-Request on a link to obtain configuration parameters from a DHCP sever. The size of the IA Address option will increase by, illustratively, 16×n bytes for the IPv6 address of the ISP gateways for the customer, where n is the number of ISP gateways for the customer. It is noted that there is typically only one ISP Gateway for a cable system or MSO (multiple-system operator) customer (e.g., the CMTS to which the broadband customer is connected). However, for an enterprise customer, there may be two or more gateways for failover purposes.

Routing Table Reduction

In various embodiments, the routing table of all or substantially all routers in each Autonomous System (ASN) will have the IPv6 block allocated for the loopback of PEs in every other ASN. That is, each ASN will advertise the IPv6 block allocated for its PE loopbacks into its transit provider or peer. The routing table of each PE in the ASN will include the IPv6 blocks assigned to and used by the customers (both residential and business) that use the PE as their ISP gateway. It is noted that the loopback of each PE in a ASN is fully routable within the ASN (i.e., the /128 of each PE loopback is advertised via IGP (such as ISIS) within the ASN).

Since only a summary or aggregated list of an ASN's loopback IP addresses needs to be advertised to other autonomous systems, significant reductions in routing table size are achieved in accordance with the various embodiments.

Figure 10:
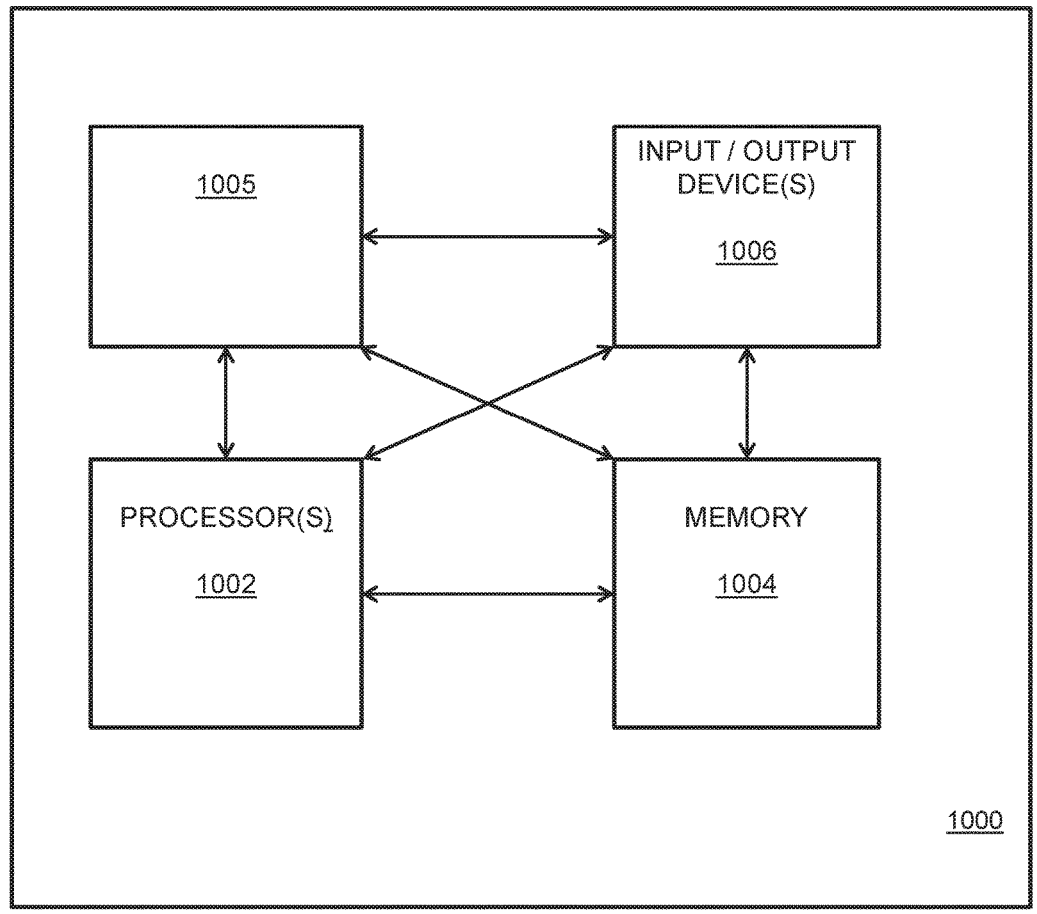
FIG. 10 depicts a high-level block diagram of a computing device suitable for use in performing the functions described herein.

FIG. 10 depicts a high-level block diagram of a computing device, such as a processor in a communications network element, suitable for use in performing functions described herein such as those associated with the various elements described herein with respect to the figures.

In particular, any of the various functional entities described herein, such as network routing entities, network management entities, server devices, client devices and so on within the communication network may be implemented in accordance with a general computing device structure such as described herein with respect to FIG. 10.

As depicted in FIG. 10, computing device 1000 includes a processor element 1002 (e.g., a central processing unit (CPU) or other suitable processor(s)), a memory 1004 (e.g., random access memory (RAM), read only memory (ROM), and the like), a cooperating module/process 1005, and various input/output devices 1006 (e.g., a user input device (such as a keyboard, a keypad, a mouse, and the like), a user output device (such as a display, a speaker, and the like), an input port, an output port, a receiver, a transmitter, and storage devices (e.g., a persistent solid state drive, a hard disk drive, a compact disk drive, and the like)).

It will be appreciated that the functions depicted and described herein may be implemented in hardware or in a combination of software and hardware, e.g., using a general purpose computer, one or more application specific integrated circuits (ASIC), or any other hardware equivalents. In one embodiment, the cooperating process 1005 can be loaded into memory 1004 and executed by processor 1002 to implement the functions as discussed herein. Thus, cooperating process 1005 (including associated data structures) can be stored on a computer readable storage medium, e.g., RAM memory, magnetic or optical drive or diskette, and the like.

It will be appreciated that computing device 1000 depicted in FIG. 10 provides a general architecture and functionality suitable for implementing functional elements described herein or portions of the functional elements described herein.

It is contemplated that some of the steps discussed herein may be implemented within hardware, for example, as circuitry that cooperates with the processor to perform various method steps. Portions of the functions/elements described herein may be implemented as a computer program product wherein computer instructions, when processed by a computing device, adapt the operation of the computing device such that the methods or techniques described herein are invoked or otherwise provided. Instructions for invoking the inventive methods may be stored in tangible and non-transitory computer readable medium such as fixed or removable media or memory, or stored within a memory within a computing device operating according to the instructions.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof. As such, the appropriate scope of the invention is to be determined according to the claims.

What is claimed is:

1. A method of routing Internet Protocol, Version 6 (IPv6) packets at a gateway configured to communicate with a plurality of client devices within a first autonomous system (AS), comprising:

examining, at said gateway, a received IPv6 packet including a header portion and a data portion, the header portion including a source address field and a destination address field;

determining said received IPv6 packet is a Prefix Reduction Option (PRO) packet if said header portion includes an active PRO type-length-value (TLV) indication and a PRO option field including a source endpoint (EP-S) address, a source gateway (GW-S) address, a destination endpoint (EP-D) address and a destination gateway (GW-D) address;

in response to said PRO packet being received from a client device within said first AS, modifying the source address field of said PRO packet header to store the GW-S address, modifying the destination address field of said PRO packet header to store the GW-D address, and transmitting the PRO packet toward the GW-D.

2. The method of claim 1, further comprising:

in response to said PRO packet being received from a second AS and said EP-D comprising a client device local to said gateway, modifying the source address field of said PRO packet header to store the EP-S address, modifying the destination address field of said PRO packet header to store the EP-D address, and transmitting the PRO packet toward the EP-D.

3. The method of claim 1, further comprising:

in response to said PRO packet being received from a second AS and said EP-D comprising a client device of an enterprise local to said gateway, modifying the source address field of said PRO packet header to store the GW-D address, modifying the destination address field of said PRO packet header to store the EP-D address, and transmitting the packet toward the EP-D.

4. The method of claim 1, wherein said PRO TLV is included within an IPv6 destination options header at the source endpoint.

5. The method of claim 4, wherein said active PRO TLV indication is provided via an Option Type Field within said IPv6 destination options header.

6. The method of claim 5, wherein said PRO address data is provided via an Option Data Field within said IPv6 destination options header.

7. The method of claim 6, wherein a data length of said PRO address data is provided via an Option Data Length Field within said IPv6 destination options header.

8. The method of claim 1, further comprising:

determining said received IPv6 packet is a non-PRO packet if said header portion does not include an active PRO TLV indication; and in response to said non-PRO packet being received from a client device within said first AS, modifying the header portion of said non-PRO packet to include an active PRO TLV indication and a PRO option field including respective EP-S, GW-S, EP-D and GW-D addresses.

9. The method of claim 8, wherein the respective EP-D address is an address in a second AS.

10. The method of claim 8, wherein the respective GW-S address is determined using a locally stored Router Advertisement retrieved from a local gateway.

11. The method of claim 8, wherein the respective GW-S address is determined using a Dynamic Host Configuration server including an Internet Service Provider (ISP) Gateway configuration parameter associated with the respective EP-S address.

12. The method of claim 8, wherein the respective GW-D address is determined using a Domain Name Server (DNS) including an ISP Gateway Resource Record associated with the respective EP-D address.

13. The method of claim 1, wherein said gateway is further configured to advertise a routing table comprising a summary of loopback addresses within said first AS.

14. An apparatus for routing Internet Protocol, Version 6 (IPv6) packets at a gateway configured to communicate with a plurality of client devices within a first autonomous system (AS), the apparatus comprising:
a processor configured for:
examining a received IPv6 packet including a header portion and a data portion, the header portion including a source address field and a destination address field;
determining said received IPv6 packet is a Prefix Reduction Option (PRO) packet if said header portion includes an active PRO type-length-value (TLV) indication and a PRO option field including a source endpoint (EP-S) address, a source gateway (GW-S) address, a destination endpoint (EP-D) address and a destination gateway (GW-D) address;
in response to said PRO packet being received from a client device within said first AS, modifying the source address field of said PRO packet header to store the GW-S address, modifying the destination address field of said PRO packet header to store the GW-D address, and transmitting said PRO packet toward the GW-D.

15. The apparatus of claim 14, wherein said processor is further configured for:
in response to said PRO packet being received from a second AS and said EP-D comprising a client device local to said gateway, modifying the source address field of said PRO packet header to store the EP-S address, modifying the destination address field of said PRO packet header to store the EP-D address, and transmitting the PRO packet toward the EP-D; and
in response to said PRO packet being received from a second AS and said EP-D comprising a client device of an enterprise local to said gateway, modifying the source address field of said PRO packet header to store the GW-D address, modifying the destination address field of said PRO packet header to store the EP-D address, and transmitting the PRO packet toward the EP-D.

16. The apparatus of claim 14, wherein said processor is further configured for:
determining said received IPv6 packet is a non-PRO packet if said header portion does not include an active PRO TLV indication; and
in response to said non-PRO packet being received from a client device within said first AS, modifying the header portion of said non-PRO packet to include an active PRO TLV indication and a PRO option field including respective EP-S, GW-S, EP-D and GW-D addresses;
wherein the respective GW-S address is determined using at least one of a locally stored Router Advertisement retrieved from a local gateway, and a Dynamic Host Configuration server including an Internet Service Provider (ISP) Gateway configuration parameter associated with the respective EP-S address;
wherein the respective GW-D address is determined using a Domain Name Server (DNS) including an ISP Gateway Resource Record associated with the respective EP-D address.

17. A tangible and non-transitory computer readable storage medium storing instructions which, when executed by a computer, adapt the operation of the computer to perform a method of routing Internet Protocol, Version 6 (IPv6) packets at a gateway configured to communicate with a plurality of client devices within a first autonomous system (AS), the method comprising:
examining a received IPv6 packet including a header portion and a data portion, the header portion including a source address field and a destination address field;
determining said received IPv6 packet is a Prefix Reduction Option (PRO) packet if said header portion includes an active PRO type-length-value (TLV) indication and a PRO option field including a source endpoint (EP-S) address, a source gateway (GW-S) address, a destination endpoint (EP-D) address and a destination gateway (GW-D) address;
in response to said PRO packet being received from a client device within said first AS, modifying the source address field of said PRO packet header to store the GW-S address, modifying the destination address field of said PRO packet header to store the GW-D address, and transmitting the PRO packet toward the GW-D.

18. The computer readable storage medium of claim 17, wherein said method further comprises:
in response to said PRO packet being received from a second AS and said EP-D comprising a client device local to said gateway, modifying the source address field of said PRO packet header to store the EP-S address, modifying the destination address field of said PRO packet header to store the EP-D address, and transmitting the PRO packet toward the EP-D; and
in response to said PRO packet being received from a second AS and said EP-D comprising a client device of an enterprise local to said gateway, modifying the source address field of said PRO packet header to store the GW-D address, modifying the destination address field of said PRO packet header to store the EP-D address, and transmitting the PRO packet toward the EP-D.

19. The computer readable storage medium of claim 17, wherein said method further comprises:
determining said received IPv6 packet is a non-PRO packet if said header portion does not include an active PRO TLV indication; and
in response to said non-PRO packet being received from a client device within said first AS, modifying the header portion of said non-PRO packet to include an active PRO TLV indication and a PRO option field including respective EP-S, GW-S, EP-D and GW-D addresses;
wherein the respective GW-S address is determined using at least one of a locally stored Router Advertisement retrieved from a local gateway, and a Dynamic Host Configuration server including an Internet Service Provider (ISP) Gateway configuration parameter associated with the respective EP-S address;
wherein the respective GW-D address is determined using a Domain Name Server (DNS) including an ISP Gateway Resource Record associated with the respective EP-D address.

20. A computer program product comprising a non-transitory computer readable medium storing instructions for causing a processor to implement a method of routing IPv6 packets at a gateway configured to communicate with a plurality of client devices within a first autonomous system (AS), the method comprising:

examining a received IPv6 packet including a header portion and a data portion, the header portion including a source address field and a destination address field;

determining said received IPv6 packet is a Prefix Reduction Option (PRO) packet if said header portion includes an active PRO type-length-value (TLV) indication and a PRO option field including a source endpoint (EP-S) address, a source gateway (GW-S) address, a destination endpoint (EP-D) address and a destination gateway (GW-D) address;

in response to said PRO packet being received from a client device within said first AS, modifying the source address field of said PRO packet header to store the GW-S address, modifying the destination address field of said PRO packet header to store the GW-D address, and transmitting the PRO packet toward the GW-D.

21. The computer program product medium of claim 20, wherein said method further comprises:

in response to said PRO packet being received from a second AS and said EP-D comprising a client device local to said gateway, modifying the source address field of said PRO packet header to store the EP-S address, modifying the destination address field of said PRO packet header to store the EP-D address, and transmitting the PRO packet toward the EP-D; and in response to said PRO packet being received from a second AS and said EP-D comprising a client device of an enterprise local to said gateway, modifying the source address field of said PRO packet header to store the GW-D address, modifying the destination address field of said PRO packet header to store the EP-D address, and transmitting the PRO packet toward the EP-D.

22. The computer program product medium of claim 20, wherein said method further comprises:

determining said received IPv6 packet is a non-PRO packet if said header portion does not include an active PRO TLV indication; and in response to said non-PRO packet being received from a client device within said first AS, modifying the header portion of said non-PRO packet to include an active PRO TLV indication and a PRO option field including respective EP-S, GW-S, EP-D and GW-D addresses;

wherein the respective GW-S address is determined using at least one of a locally stored Router Advertisement retrieved from a local gateway, and a Dynamic Host Configuration server including an Internet Service Provider (ISP) Gateway configuration parameter associated with the respective EP-S address;

wherein the respective GW-D address is determined using a Domain Name Server (DNS) including an ISP Gateway Resource Record associated with the respective EP-D address.

* * * * *